(12) United States Patent
Xu et al.

(10) Patent No.: US 9,109,685 B2
(45) Date of Patent: Aug. 18, 2015

(54) FLEXSPLINE PROTECTIVE STRUCTURE AND ROBOT ARM MECHANISM USING SAME

(75) Inventors: Xiao-Ming Xu, Shenzhen (CN); Chia-Peng Day, Santa Clara, CA (US); Zhen-Xing Liu, Shenzhen (CN)

(73) Assignees: HONG FU JIN PRECISION INDUSTRY (ShenZhen) CO., LTD., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 707 days.

(21) Appl. No.: 13/437,129

(22) Filed: Apr. 2, 2012

(65) Prior Publication Data

US 2013/0068060 A1     Mar. 21, 2013

(30) Foreign Application Priority Data

Sep. 16, 2011  (CN) .......................... 2011 1 0275553

(51) Int. Cl.
| | | |
|---|---|---|
| *B25J 17/00* | (2006.01) | |
| *F16H 49/00* | (2006.01) | |
| *F16D 9/06* | (2006.01) | |
| *B25J 19/06* | (2006.01) | |
| *B25J 9/10* | (2006.01) | |
| *F16H 35/10* | (2006.01) | |

(52) U.S. Cl.
CPC ............. *F16H 49/001* (2013.01); *B25J 9/1025* (2013.01); *B25J 19/065* (2013.01); *F16D 9/06* (2013.01); *F16H 35/10* (2013.01); *Y10T 74/20329* (2015.01); *Y10T 403/11* (2015.01)

(58) Field of Classification Search
CPC ...... B25J 9/1025; B25J 19/065; F16H 49/001
USPC .................................. 74/490.05, 640; 901/49
See application file for complete search history.

(56) References Cited

U.S. PATENT DOCUMENTS

| | | | | |
|---|---|---|---|---|
| 4,347,715 A | * | 9/1982 | Carman et al. ................. | 464/32 |
| 8,191,439 B2 | * | 6/2012 | Kobayashi et al. ........... | 74/89.23 |
| 2009/0253521 A1 | * | 10/2009 | Arden et al. .................... | 464/32 |

FOREIGN PATENT DOCUMENTS

| | | | | |
|---|---|---|---|---|
| CN | 200992719 Y | | 12/2007 | |
| CN | 201560447 U | | 8/2010 | |
| CN | 102085667 A | | 6/2011 | |
| EP | 2085631 A1 | * | 8/2009 | ............... F16D 9/06 |
| TW | 201109139 A | | 3/2011 | |
| WO | WO 8500315 A | * | 1/1985 | ............... B25J 17/02 |

* cited by examiner

*Primary Examiner* — William Kelleher
*Assistant Examiner* — Terence Boes
(74) *Attorney, Agent, or Firm* — Novak Druce Connolly Bove + Quigg LLP

(57) ABSTRACT

A flexspline protective structure includes a first rotation member, a second rotation member and a plurality of fixing members. The second rotation member is sleeved on the first rotation member. The plurality of fixing members fix the first rotation member and the second rotation member together and are capable of breaking off in the event of jamming or other mischance to enable the second rotation member to rotate freely relative to the first rotation member. The disclosure presents a robot arm mechanism equipped with the flexspline protective structure.

9 Claims, 5 Drawing Sheets

FLEXSPLINE PROTECTIVE STRUCTURE AND ROBOT ARM MECHANISM USING SAME

BACKGROUND

1. Technical Field

The present disclosure relates to a flexspline protective structure and a robot arm mechanism use the flexspline protective structure.

2. Description of Related Art

A robot arm mechanism may include a first mechanical arm, a second mechanical arm, a reducer and a transmission assembly. The reducer is connected to the transmission assembly, and both of the reducer and the transmission assembly are received in the first mechanical arm and the second mechanical arm. The first mechanical arm is rotatably connected to the second mechanical arm via the reducer and the transmission assembly. A flexspline of the reducer is vulnerable to become damaged when the second mechanical arm is subjected to an unexpected collision or an undue amount of torsion. A flexspline protective structure is needed to protect the flexspline of the reducer. A flexspline protective structure of related art includes an electric motor, a transmission shaft controlled by the electric motor, and a connecting member. When the robot arm mechanism is subjected to an external force, the flexspline protective structure drives the transmission assembly away from the reducer, thereby preventing damage to the flexspline. However, such a flexspline protective structure has a complicated structure, and low rigidity.

Therefore, there is room for improvement in the art.

BRIEF DESCRIPTION OF THE DRAWINGS

The components in the drawings are not necessarily drawn to scale, the emphasis instead placed upon clearly illustrating the principles of the present disclosure. Moreover, in the drawings, like reference numerals designate corresponding parts throughout the several views.

DETAILED DESCRIPTION

Figure 1:
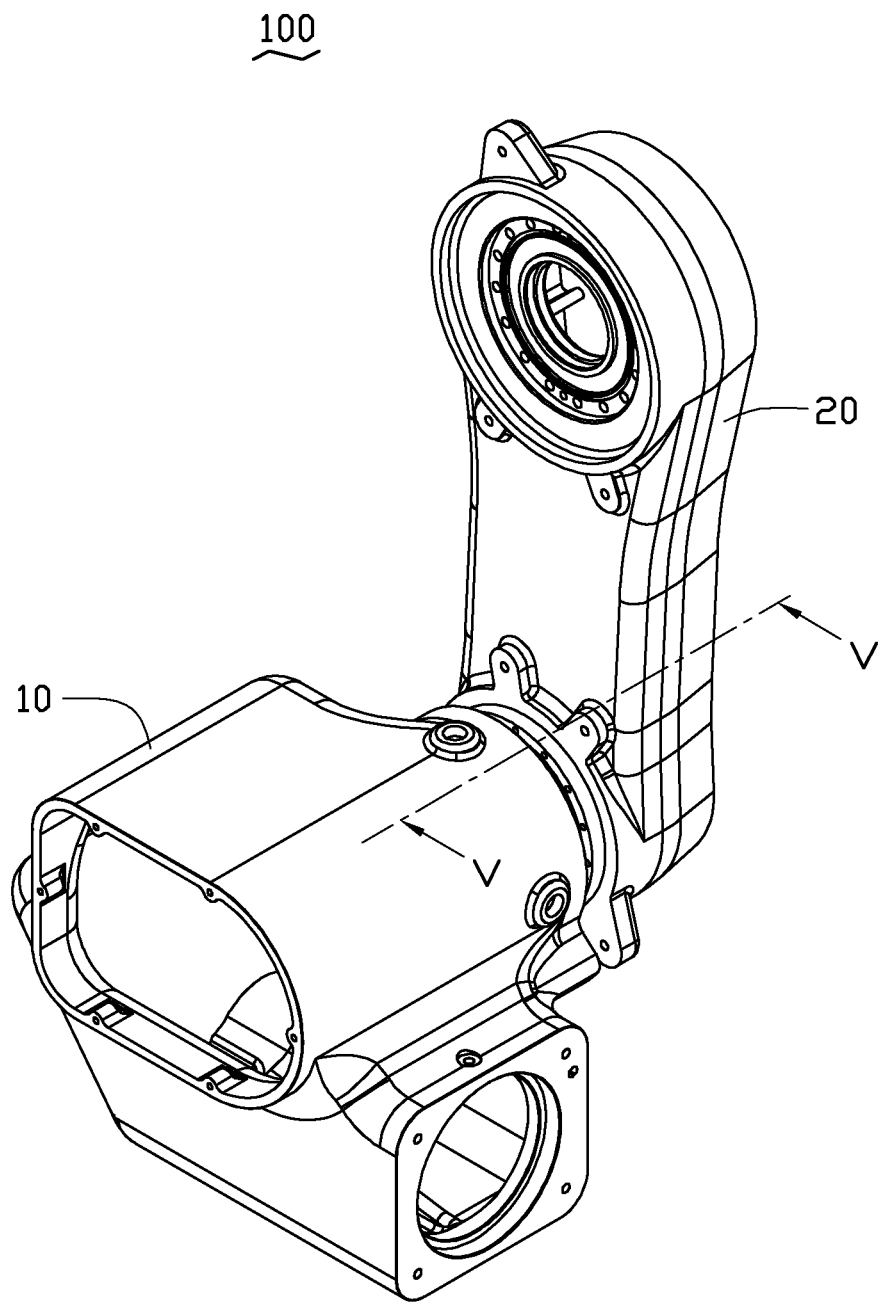
FIG. 1 is an isometric view of an embodiment of a robot arm mechanism.
Figure 2:
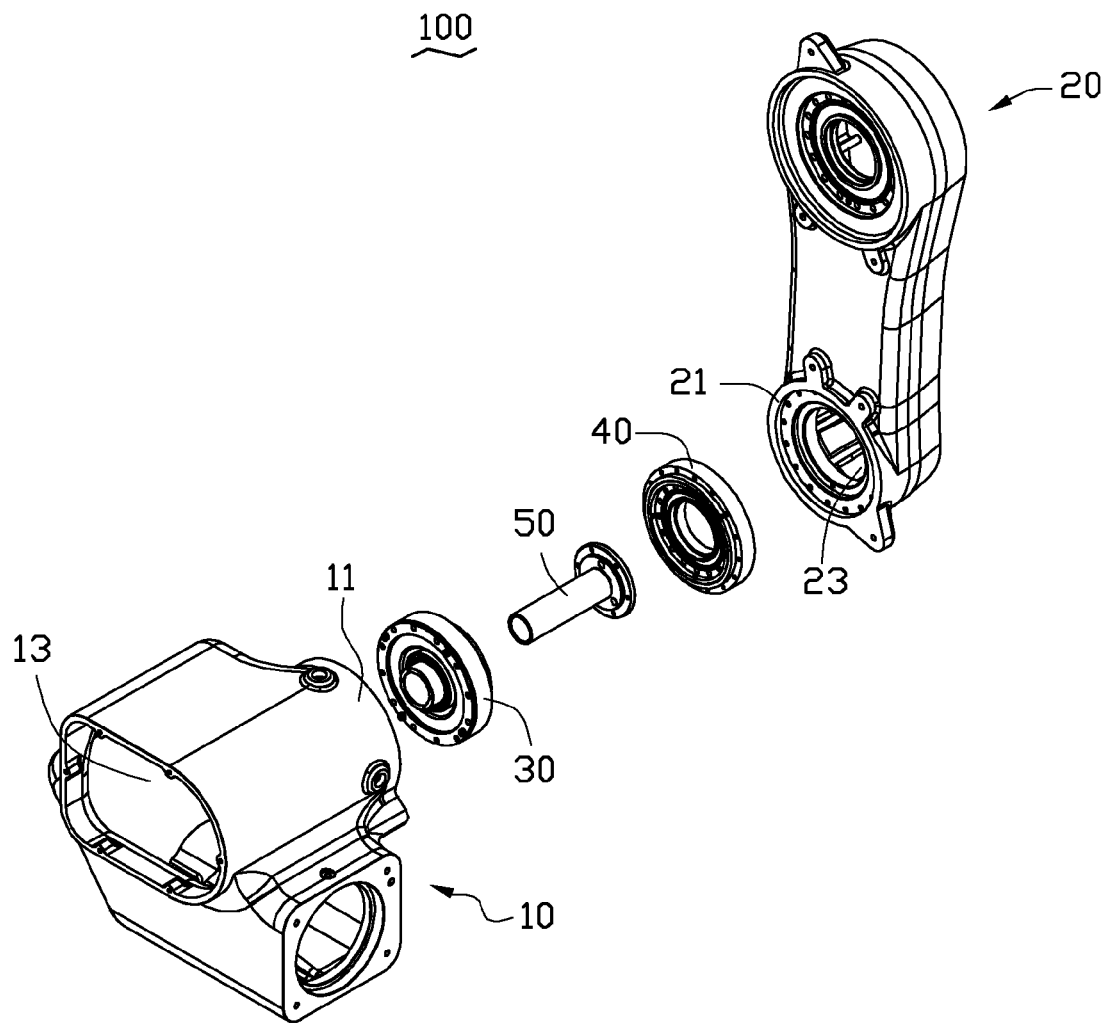
FIG. 2 is an exploded, isometric view of the robot arm mechanism of FIG. 1.

Referring to FIGS. 1 and 2, an embodiment of a robot arm mechanism 100 includes a first arm 10, a second arm 20, a reducer 30, a flexspline protective structure 40 and a cable passage barrel 50. The first arm 10 is rotatably connected to the second arm 20 via the reducer 30 and the flexspline protective structure 40. The reducer 30 is positioned between the first arm 10 and the second arm 20 for transmitting power from the first arm 10 to the second arm 20. The reducer 30 is configured for gearing down a higher rotating speed of the first arm 10, and then transferring a reduced rotating speed and the correspondingly-increased torsional force to the second arm 20. The flexspline protective structure 40 is positioned between the reducer 30 and the second arm 20 for protecting the reducer 30 from being damaged. The cable passage barrel 50 is assembled within the reducer 30 and the flexspine protective structure 40, with two ends thereof received in the first arm 10 and the second arm 20, respectively. The cable passage barrel 50 is capable of receiving electrical cables of the robot arm mechanism 100.

The first arm 10 and the second arm 20 are both hollow, in which the first arm 10 includes a first connecting portion 11, and defines a first receiving chamber 13 extending through the first connecting portion 11. The second arm 20 includes a second connecting portion 21, and defines a second receiving chamber 23 corresponding to the first receiving chamber 13 of the first arm 10. The first connecting portion 11 is rotatably connected to the second connecting portion 21, and the first receiving chamber 13 communicates with the second receiving chamber 23.

Figure 3:
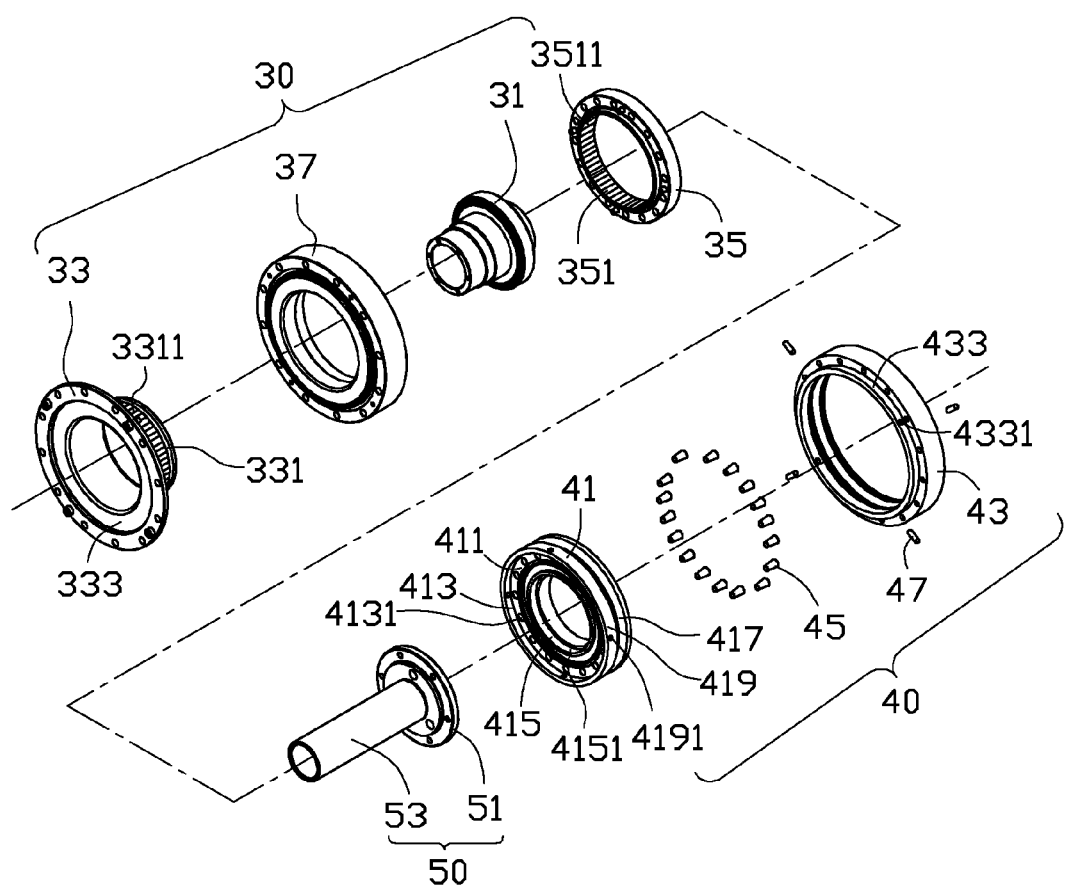
FIG. 3 is an exploded, isometric view of a reducer, a cable passing barrel and a flexspline protective structure of the robot arm mechanism of FIG. 1.
Figure 4:
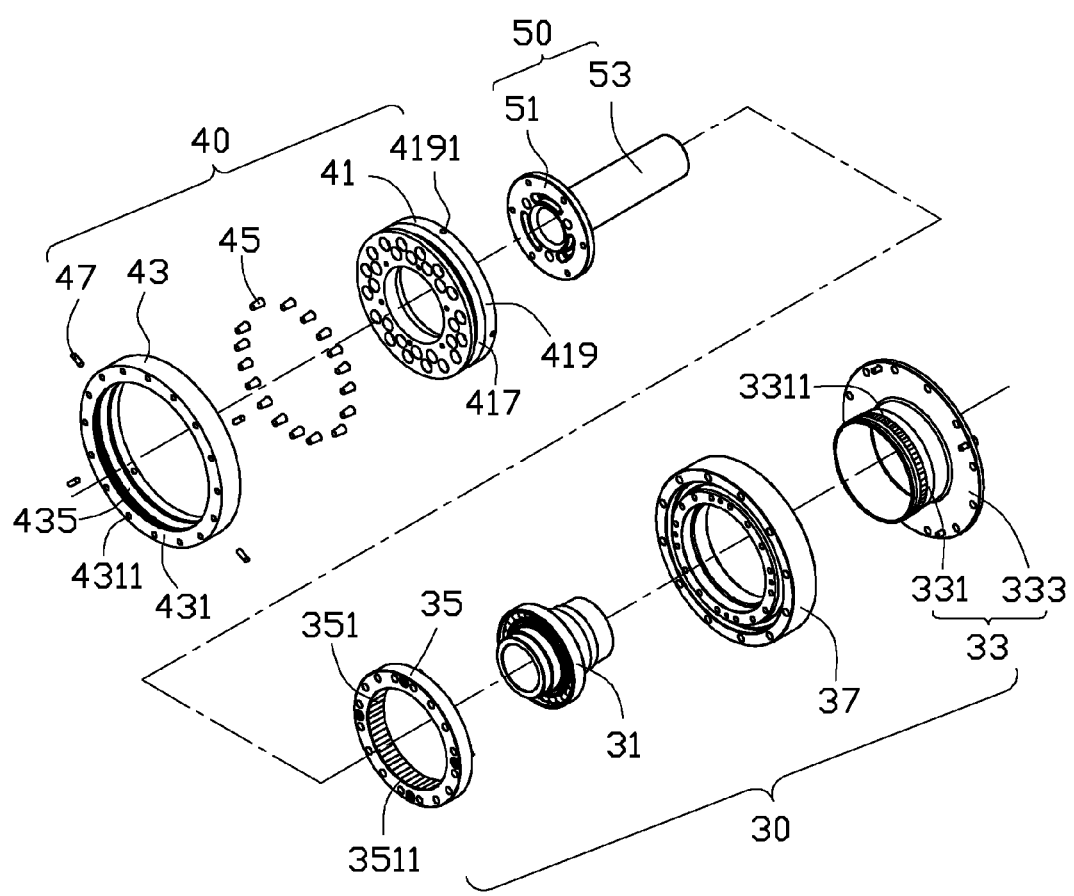
FIG. 4 is similar to FIG. 3, but viewed from another aspect.
Figure 5:
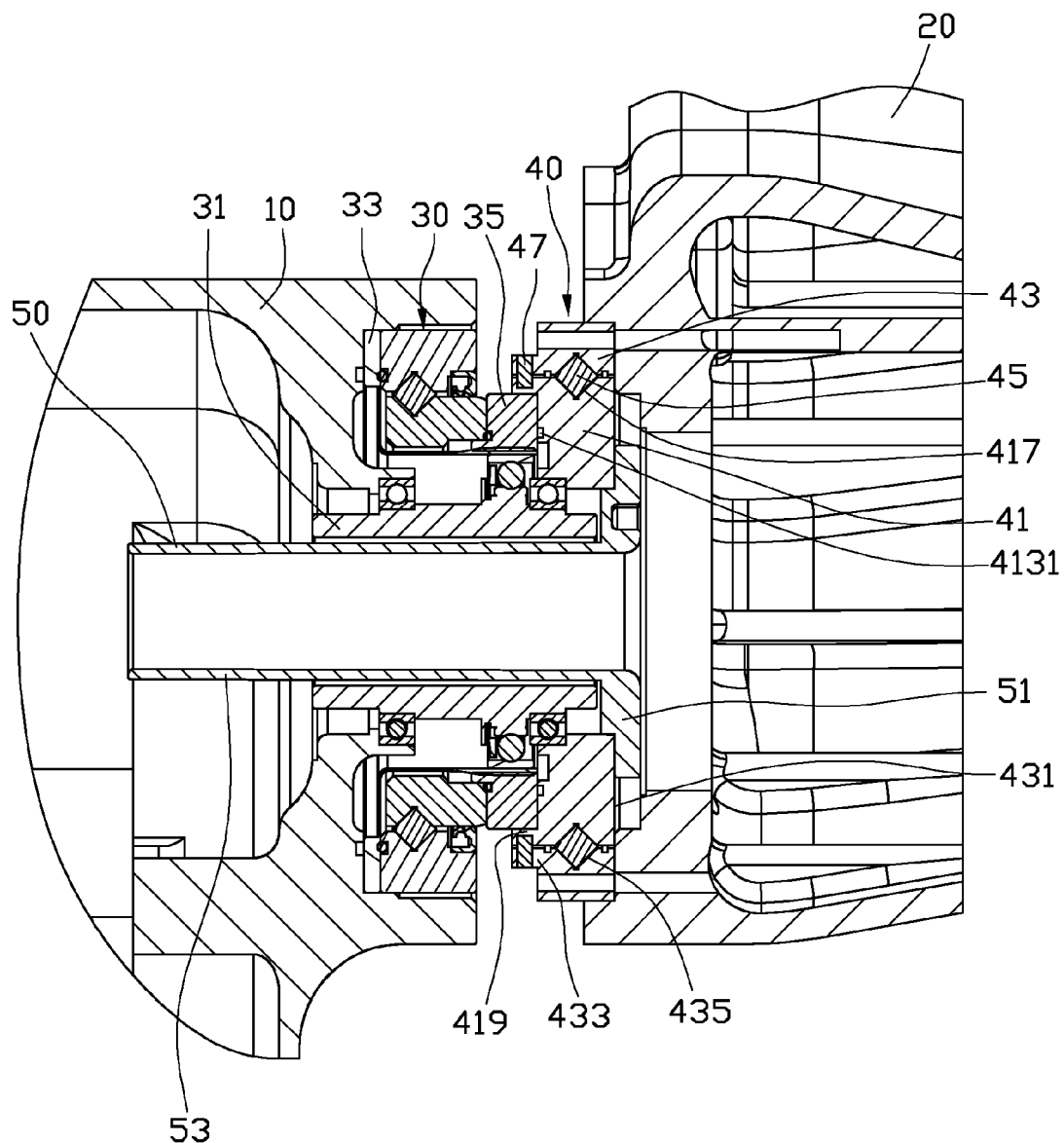
FIG. 5 is a cross-section of the robot arm mechanism of FIG. 1 taken along line v-v.

Also referring to FIGS. 3 and 4, the reducer 30 includes a driver 31, a flexspline 33, a rigid gear 35 and a bearing 37. The driver 31 is received in and fixed to the flexspline 33. The rigid gear 35 and the bearing 37 are sleeved on the flexspline 33 side by side. In the embodiment, the reducer 30 is a harmonic reducer, and the driver 31 is a wave generator.

The flexspline 33 is a cylindrical shell, and includes a hollow cylindrical containing portion 331 and a flange 333 formed on one end of the containing portion 331. A plurality of first teeth 3311 are separately formed on an outer peripheral wall of containing portion 331. The rigid gear 35 is substantially ring-shaped, and includes a peripheral inner wall 351 and a plurality of second teeth 3511 separately formed on the peripheral inner wall 351 for engaging with the corresponding first teeth 3311. The rigid gear 35 is rotatably sleeved on the containing portion 331, and the second teeth 3511 are engaged with the first teeth 3311. In the illustrated embodiment, the number of teeth of the first teeth 3311 is less than that of the second teeth 3511. The bearing 37 is sleeved on the containing portion 331 and positioned between the flange 333 and the rigid gear 35, the outer ring of the bearing 37 is fixed to the flange 333, and the inner ring of the bearing 37 is fixed to the rigid gear 35.

The flexspline protective structure 40 is rotatably sleeved on the driver 31 and fixed to the rigid gear 35. The flexspline protective structure 40 includes a first rotation member 41, a second rotation member 43, a plurality of rolling members 45 and a plurality of fixing members 47. The second rotation member 43 is sleeved on the first rotation member 41, the plurality of rolling members 45 are received between the first rotation member 41 and the second rotation member 43. The plurality of fixing members 47 are mounted on the first rotation member 41 and the second rotation member 43 to fix the first rotation member 41 to the second rotation member 43. The plurality of the fixing members 47 are capable of breaking off to enable the second rotation member 43 to rotate freely relative to the first rotation member 41 when the second rotation member 43 suffers an unexpected collision or an undue amount of torsion.

The first rotation member 41 is annular. A recess 411 is recessed from one end surface of the first rotation member 41 thereby forming an annular stepped shaped structure. The recess 411 defines a first mounting surface 413 surrounding thereof and a plurality of mounting holes 4131 on the first mounting surface 413. The plurality of mounting holes 4131 are aligned in a loop surrounding the recess 411. The first rotation member 41 includes a mounting portion 415 around the inner surface thereof and a first fixing portion 419 surrounding the recess 411. The mounting portion 415 defines an annular first attaching surface 4151. The first fixing portion 419 defines a plurality of first fixing holes 4191 uniformly arranged around the periphery of the first fixing portion 419.

The plurality of first fixing holes 4191 are defined radially in the first rotation member 41. A substantially V-shaped first groove 417 is defined around the peripheral outer surface of the first rotation member 41. The first groove 417 is located at the middle of the first rotation member 41 along the axial direction and adjacent to the first fixing portion 419.

The second rotation member 43 is substantially annular and is sleeved on the first rotation member 41. The second rotation member 43 includes a second mounting surface 431, a second fixing portion 433 and a ring-shaped second groove 435; the second groove 435 is defined in the inner surface of the second rotation member 43. The second mounting surface 431 is located at an end of the second rotation member 43 away from the first mounting surface 413 of the first rotation member 41. The second mounting surface 431 defines a plurality of mounting holes 4311 for mounting the second arm 20. The second fixing portion 433 is axially formed on an end of the second rotation member 43 opposite to the second mounting surface 431, and defines a plurality of second fixing holes 4331 around the periphery thereof. The plurality of second fixing holes 4331 extends along the radial direction of the second fixing portion 433 and communicates with the plurality of first fixing holes 4191 of the first rotation member 41. The cross-section of the second groove 435 is substantially V-shaped, and the second groove 435 faces toward the first groove 417. Each rolling member 45 is substantially columnar, and is rollably contained between the first groove 417 of the first rotation member 41 and the second groove 435 of the second rotation member 43.

In the embodiment, the number of the fixing members 47 is four. Each of the plurality of fixing member 47 is columnar and made of ceramic materials.

The cable passage barrel 50 includes a hollow annular main body 51 and a hollow extending portion 53 coaxially extending from one end of the main body 51.

Referring to FIGS. 1 through 5, in assembly, the flexspline 33 is received in the first arm 10, and the flange 333 of the flexspline 33 is fixed to the first arm 10. The driver 31 is received in and fixed to the containing portion 331. The cable passage barrel 50 extends through the driver 31 and the flexspline protective structure 40. The main body 51 of the cable passage barrel 50 is fixed to the second arm 20.

The bearing 37 is sleeved on the containing portion 331. The rigid gear 35 is sleeved on the containing portion 331 and adjacent to the bearing 37. The outer ring of the bearing 37 is fixed to the flange 333, and the inner ring of the bearing 37 is fixed to the rigid gear 35. The second teeth 3511 of the rigid gear 35 engage with the first teeth 3311 of the flexspline 33. The first rotation member 41 is rotatably sleeved on the driver 31 via a bearing, and the first rotation member 41 is partially sleeved on the rigid gear 35 and fixed to an end of the rigid gear 35 via the first mounting surface 413. The plurality of rolling members 45 are partially received in the first groove 417, with every two adjacent rolling members 45 configured perpendicular to each other. The second rotation member 43 is sleeved on the first rotation member 41, and the second groove 435 and the first groove 417 face each other and receive the plurality of rolling members 45 therebetween. The second fixing portion 433 of the second rotation member 43 is sleeved on the first fixing portion 419 of the first rotation member 41, the plurality of first fixing holes 4191 communicates with the plurality of second fixing holes 4331. Each of the plurality of fixing members 47 extends into one first fixing hole 4191 and one second fixing hole 4331 to fix the second rotation member 43 to the first rotation member 41. The second rotation member 43 is fixed to the second arm 20 via the second mounting surface 431, thus the assembling of the robot arm mechanism 100 is thereby accomplished.

In use, the driver 31 drives the flexspline 33 to rotate, the flexspline 33 drives the first arm 10 and the rigid gear 35 to rotate, and the rigid gear 35 drives the second arm 20 to rotate via the flexspline protective structure 40. Since the number of teeth of the first teeth 3311 of the flexspline 33 is less than that of the second teeth 3511 of the rigid gear 35, thus, the rotation speeds of the first arm 10 and the second arm 20 are different. When the second arm 20 suffers a collision or an undue amount of torsion by mischance or accident, the plurality of fixing members 47 break off, and then the second rotation member 43 is capable of rotating freely relative to the first rotation member 41, the rotation of the second arm 20 relative to that of the first arm 10 is segregated by the bearing 37. Meanwhile, the transmission of power between the second arm 20 and the reducer 30 is interrupted, and thus the flexspline 33 and the rigid gear 35 are protected.

The flexspline protective structure 40 is capable of preventing catastrophic failure of the flexspine 33 and the rigid gear 35 and the associated consequential losses or expenses, owing to the breaking off of the plurality of fixing members 47. The plurality of fixing members 47 are made of ceramic materials, and the stress limit can be selected with a high accuracy. The flexspline protective structure 40 merely includes a first rotation member 41, a second rotation member 43 and a plurality of fixing members 47, making it to have a very simple overall structure indeed. The flexspline protective structure 40 is capable of maintaining high rigidity due to its simple structure and is also capable of reducing overall size of the robot arm mechanism 100 because of its small size. Additionally, the cable passage barrel 50 is capable of increasing the concentricity between the reducer 30 and the flexspline protective structure 40, thus decreasing any whipping and reinforcing the precise operation of the robot arm mechanism 100.

It should be noted that the number of the first fixing holes 4191 and the second fixing holes 4331 is variable, and the number of the fixing members 47 should match with that of the first and second fixing holes 4191, 4331, respectively. If the second rotation member 43 is capable of rotating smoothly relative to the first rotation member 41, the plurality of rolling members 45 may be omitted.

It should be noted that the diameter of the first fixing holes 4191 and the second fixing holes 4331 is variable, and the diameter of the fixing members 47 should match with the diameter of the first and second fixing holes 4191, 4331, respectively.

It should be noted that an intersection rolling bearing including a first fixing portion and a second fixing portion may be employed in the robot arm mechanism 100 to function as the flexspline protective structure 40, thus the first rotation member 41, the second rotation member 43 and the plurality of rolling members 45 may be omitted accordingly.

While various embodiments have been described and illustrated, the disclosure is not to be construed as being restricted thereto. Various modifications can be made to the embodiments by those skilled in the art without departing from the true spirit and scope of the disclosure as defined by the appended claims.

What is claimed is:

1. A robot arm mechanism, comprising:
   a first arm;
   a second arm;
   a reducer comprising:
      a flexspline fixed to the first arm and a rigid gear engaging with the flexspline; and a flexspline protective structure, comprising:
   a first rotation member fixed to the rigid gear;
   a second rotation member sleeved on the first rotation member; and
   at least one fixing member fixedly connecting the first rotation member and the second rotation member together,
   wherein the at least one fixing member is capable of breaking off to enable the second rotation member to rotate relative to the first rotation member freely when the second rotation member suffers an undue amount of torsion or an unexpected collision.

2. The robot arm mechanism of claim 1, wherein the flexspline protective structure further comprises a plurality of rolling members rotatably received between the first rotation member and the second rotation member.

3. The robot arm mechanism of claim 2, wherein the first rotation member and the second rotation member are both annular, the first rotation member defines a first groove around the peripheral surface thereof, the second rotation member defines a second groove around the inner surface thereof, and the plurality of rolling members are contained between the first groove and the second groove.

4. The robot arm mechanism of claim 1, wherein the first rotation member and the second rotation member are both annular, the first rotation member comprises a first fixing portion axially formed on an end thereof, the second rotation member comprises a second fixing portion axially formed on an end thereof, the second fixing portion is sleeved on the first fixing portion, and the at least one fixing member fixedly mounted the first rotation member and the second rotation member.

5. The robot arm mechanism of claim 4, wherein the first fixing portion defines a plurality of first fixing holes uniformly arranged along the periphery thereof, the second fixing portion defines a plurality of second fixing holes along the periphery thereof uniformly, the plurality of first fixing holes communicate with the plurality of the second fixing holes respectively;
   the at least one fixing member comprises a plurality of fixing members, the plurality of fixing members extend through the plurality of first fixing holes and the second fixing holes respectively.

6. The robot arm mechanism of claim 4, wherein the reducer further comprises a bearing, the flexspline comprises a containing portion and a flange formed on an end of the containing portion, the containing portion comprises a plurality of first teeth separately formed around the outer periphery wall thereof, the rigid gear comprises a periphery inner wall and a plurality of second teeth separately formed around the inner wall, the rigid gear is sleeved on the containing portion via the inner wall, the second teeth engages with the first teeth, the bearing is sleeved on the containing portion between the flange and the rigid gear, the outer ring of the bearing is fixed to the flange, and the inner ring of the bearing is fixed to the rigid gear.

7. The robot arm mechanism of claim 6, wherein a recess is recessed from an end of the first rotation member, the first fixing portion surrounds the recess, and the first rotation member is partially sleeved on the rigid gear.

8. The robot arm mechanism of claim 1, the reducer further comprises a driver partially received in and fixedly connected to the flexspline, the first rotation member is rotatably sleeved on the driver.

9. The robot arm mechanism of claim 8, wherein the driver is a wave generator, the at least one fixing member is made of ceramic materials.

* * * * *